(12) United States Patent
Higuchi et al.

(10) Patent No.: US 9,914,663 B2
(45) Date of Patent: Mar. 13, 2018

(54) MANUFACTURING FACILITY FOR QUICKLIME, AND MANUFACTURING FACILITY AND MANUFACTURING PROCESS FOR SLAKED LIME

(75) Inventors: Naohiro Higuchi, Naka (JP); Hirokazu Shima, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 515 days.

(21) Appl. No.: 13/885,701

(22) PCT Filed: Nov. 21, 2011

(86) PCT No.: PCT/JP2011/006466
§ 371 (c)(1),
(2), (4) Date: May 16, 2013

(87) PCT Pub. No.: WO2012/131821
PCT Pub. Date: Oct. 4, 2012

(65) Prior Publication Data
US 2013/0236391 A1  Sep. 12, 2013

(30) Foreign Application Priority Data
Mar. 28, 2011 (JP) .................................. 2011-069611

(51) Int. Cl.
*C04B 2/04* (2006.01)
*C04B 2/08* (2006.01)
(Continued)

(52) U.S. Cl.
CPC .................. *C04B 2/08* (2013.01); *C04B 2/04* (2013.01); *C04B 2/10* (2013.01); *C04B 2/106* (2013.01); *C04B 2/12* (2013.01); *Y02P 40/42* (2015.11)

(58) Field of Classification Search
CPC ........... C04B 7/434; C04B 2/10; C04B 2/106; C04B 2/12; C04B 2/08
See application file for complete search history.

(56) References Cited

U.S. PATENT DOCUMENTS 1,511,446 A * 10/1924 Doyle ........................... 423/155
1,720,026 A *  7/1929 Barton .......................... 423/640
(Continued)

FOREIGN PATENT DOCUMENTS

JP   51 40376    4/1976
JP   57 67013    4/1982
(Continued)

OTHER PUBLICATIONS

International Search Report dated Feb. 28, 2012 in PCT/JP11/006466 filed Nov. 21, 2011.

*Primary Examiner* — Jennifer A Leung
(74) *Attorney, Agent, or Firm* — Oblon, McClelland, Maier & Neustadt, L.L.P.

(57) ABSTRACT

A manufacturing facility for quicklime is provided, which can manufacture highly active quicklime by a simple manufacturing facility, and which can also separate and recover, in a high concentration, $CO_2$ gas generated at the time of manufacturing quicklime. The manufacturing facility for quicklime is configured by including: a regenerative calciner 11 which has a supply port 11a for supplying granular limestone C into the regenerative calciner 11, heating means capable of maintaining the temperature of the atmosphere in the regenerative calciner 11 at a temperature not less than the calcination temperature of the limestone, an exhaust pipe 15 connected to an upper part of the regenerative calciner 11 so as to discharge combustion exhaust gas of the heating means and $CO_2$ gas generated by the calcination of limestone, and a discharge port 14 for taking out quicklime produced by the calcination; and a heat medium 16 which has a particle
(Continued)

diameter larger than the particle diameter of the limestone and which is filled in the regenerative calciner 11.

16 Claims, 5 Drawing Sheets

(51) Int. Cl.
*C04B 2/10* (2006.01)
*C04B 2/12* (2006.01)

(56) References Cited

U.S. PATENT DOCUMENTS

| | | | | |
|---|---|---|---|---|
| 2,041,813 A * | 5/1936 | Brooks et al. | ................ | 423/640 |
| 2,043,859 A * | 6/1936 | Moore | ................ | C04B 2/10 |
| | | | | 373/112 |
| 2,498,710 A * | 2/1950 | Roetheli | ................ | 423/177 |
| 4,707,350 A * | 11/1987 | Baudequin | ................ | C04B 2/10 |
| | | | | 165/104.16 |
| 5,653,948 A * | 8/1997 | Kato et al. | ................ | 423/177 |
| 2010/0037804 A1* | 2/2010 | Paxton | ................ | C04B 7/367 |
| | | | | 106/758 |

FOREIGN PATENT DOCUMENTS

| | | |
|---|---|---|
| JP | 62 283847 | 12/1987 |
| JP | 1 127036 | 5/1989 |
| JP | 10 167775 | 6/1998 |
| JP | 2005 320207 | 11/2005 |
| JP | 2007 197319 | 8/2007 |

* cited by examiner

MANUFACTURING FACILITY FOR QUICKLIME, AND MANUFACTURING FACILITY AND MANUFACTURING PROCESS FOR SLAKED LIME

TECHNICAL FIELD

The present invention relates to a manufacturing facility for quicklime, and a manufacturing facility and manufacturing process for slaked lime, which can manufacture highly reactive slaked lime and which can separate and recover, in a high concentration, $CO_2$ gas generated at the time of calcining quicklime as a raw material of the slaked lime.

BACKGROUND ART

In recent years, attempts for reducing carbon dioxide ($CO_2$) gas, which is a main cause of the global warming phenomenon, have been made worldwide and in all industries.

The lime industry, together with the cement industry, the electric power industry, the steel industry, and the like, is one of the industries which discharge a large amount of $CO_2$ gas. For this reason, the reduction in the amount of $CO_2$ gas discharged in the lime industry greatly contributes to the reduction in the total amount of $CO_2$ gas discharged in Japan.

FIG. 5 shows a common quicklime manufacturing facility in the lime industry. In FIG. 5, reference numeral 1 denotes a rotary kiln (quicklime kiln) for producing quicklime by burning. Note that the rotary kiln 1 is a horizontal kiln, but kilns, such as Meltz kiln and Beckenbach kiln, are known as conventional vertical kilns for producing quicklime by burning.

A preheater 3 for preheating limestone lumps is provided at the kiln inlet part 2 on the left side of the rotary kiln 1 in FIG. 5, and a main burner 5 for heating the inside of the rotary kiln 1 is provided at the kiln outlet part on the right side of the rotary kiln 1 in FIG. 5.

Here, as the preheater 3, for example, a grate preheater, or the like, is used. The grate preheater is configured by connecting a plurality of grates in a ring shape, and is configured such that, as limestone lumps, which are fed to the upstream side of the grate preheater 3 from a feed line 4 and placed on the grates, are successively moved to the downstream side of the preheater 3, the limestone lumps are preheated by the high-temperature exhaust gas fed from the rotary kiln 1 and are introduced into the kiln inlet part 2 of the rotary kiln 1.

On the other hand, the combustion exhaust gas discharged from the rotary kiln 1 is introduced into the preheater 3 and successively sent to the upstream side of the preheater so as to preheat the limestone lumps. Finally, the exhaust gas is exhausted from the exit of the preheater 3 by an exhaust fan 6 via an exhaust line 7.

In the quicklime manufacturing facility configured as described above, quicklime lump is manufactured in such a manner that limestone ($CaCO_3$) lumps are first preheated by the preheater 3, and then burnt in the rotary kiln 1 in high temperature atmosphere at about 1400° C.

In the calcination process, the chemical reaction as represented by the formula: $CaCO_3 \rightarrow CaO + CO_2\uparrow$ is caused so as to generate $CO_2$ gas (generation of $CO_2$ gas resulting from the raw material). The concentration of $CO_2$ gas resulting from the raw material is theoretically 100%. Further, fossil fuel is combusted in the main burner 5 in order to maintain the atmosphere in the rotary kiln 1 at a high temperature. As a result, $CO_2$ gas is also generated by the combustion of fossil fuel (generation of $CO_2$ gas resulting from the fuel). Here, much $N_2$ gas in the combustion air is contained in the exhaust gas discharged from the main burner 5, and hence the concentration of $CO_2$ gas contained in the exhaust gas and resulting from the fuel is as low as about 15%.

As a result, the high-concentration $CO_2$ gas resulting from the raw material and the low-concentration $CO_2$ gas resulting from the fuel mixedly exist in the exhaust gas discharged from the rotary kiln 1. Therefore, in spite of the fact that the discharge amount of $CO_2$ is large, there is a problem that the $CO_2$ gas has a concentration of about 30 to 35% and hence is difficult to be recovered.

On the other hand, as the $CO_2$ gas recovery methods which are being developed at present, there are methods based on a fluid recovery system, a membrane separation system, a solid adsorption system, and the like. However, the methods have a problem that the cost for recovering $CO_2$ gas is still very high.

Further, as a method to prevent the global warming due to $CO_2$ discharged from the quicklime manufacturing facility, a method has also been proposed in which $CO_2$ discharged at a low concentration from the discharge source is separately recovered so as to be condensed up to a concentration of about 100%, and is then liquefied so as to be stored in the ground. However, in this method, the cost for separating and recovering $CO_2$ is high, and hence this method is not realized for the same reason as that for the above described methods.

On the other hand, an apparatus for producing and recovering $CO_2$ gas has been proposed in the following Patent Literature 1 as an apparatus for recovering $CO_2$ gas generated in the process of burning limestone as $CO_2$ gas having a high utilization value and a high purity. The apparatus includes a decomposition reaction tower to which limestone is fed, a reheating tower to which quicklime (CaO) is fed as a heat medium and which also heats the quicklime to a temperature not less than the calcination temperature of limestone with a combustion gas, and a connecting pipe which connects the decomposition reaction tower with the reheating tower.

The above-described conventional recovering apparatus is configured such that the quicklime which has been heated in the reheating tower is fed to the decomposition reaction tower through the connecting pipe to form a fluidized bed, such that $CO_2$ gas is produced in the decomposition reaction tower by burning the limestone and also a part of the produced quicklime is discharged, and such that the other part of the quicklime is again sent to the reheating tower through the connecting pipe so as to be reheated in the reheating tower.

In this way, in the above-described apparatus for producing and recovering $CO_2$ gas, the decomposition reaction tower which is a place for conducting the decomposition reaction of the limestone therein is separated from the reheating tower which is a place for generating the amount of heat necessary for the decomposition reaction therein. Thereby, it is possible to prevent the $CO_2$ gas generated through the decomposition reaction of the limestone from being mixed with the combustion exhaust gas generated for heating the heat medium. Accordingly, the apparatus for producing and recovering $CO_2$ gas is considered to be capable of recovering $CO_2$ gas in high concentration from the decomposition reaction tower.

CITATION LIST

Patent Literature

Patent Literature 1: Japanese Patent laid-Open No. 57-67013

SUMMARY OF INVENTION

Technical Problem

However, the apparatus for producing and recovering $CO_2$ gas disclosed in the Patent Literature 1 described above has a problem that the scale of the apparatus becomes large because the decomposition reaction tower which is a place for conducting the decomposition reaction of the limestone therein is separated from the reheating tower which is a place for generating the amount of heat necessary for the decomposition reaction therein.

In addition, in the apparatus for producing and recovering $CO_2$ gas of the Patent Literature 1 described above, quicklime is used as a heat medium for heating and calcining the limestone. Therefore, the quicklime needs to be heated to a temperature not less than the calcination temperature of limestone, specifically, to a temperature of 1000° C. or higher in the reheating tower. As a result, a powder of quicklime, and the like, flowing in the decomposition reaction tower and the reheating tower tends to be easily solidified, which also causes a problem that deposition or blockage occurs in the connecting pipes, and the like, and the apparatus becomes inoperable.

The present invention has been made in view of the above-described circumstances. An object of the present invention is to provide a manufacturing facility for quicklime, and a manufacturing facility and process for slaked lime using the manufacturing facility for quicklime which can manufacture highly active quicklime by a simple manufacturing facility to thereby enable highly reactive slaked lime to be manufactured, and which can separate and recover, in a high concentration, $CO_2$ gas generated at the time of manufacturing quicklime, and which, because the thermal energy of $CO_2$ gas can be effectively used therein, is excellent in economic efficiency.

Solution to Problem

In order to solve the above described problems, a manufacturing facility for quicklime according to a first aspect of the present invention is featured by including: a regenerative calciner which is provided with a supply port for supplying granular limestone into the regenerative calciner, heating means capable of maintaining the temperature of the atmosphere in the regenerative calciner at a temperature not less than the calcination temperature of the limestone, an exhaust pipe connected to an upper part of the regenerative calciner and configured to discharge combustion exhaust gas of the heating means and $CO_2$ gas generated by calcination of the limestone, and a discharge port for taking out quicklime produced by the calcination; and a heat medium which has a particle diameter larger than the particle diameter of the limestone and which is filled in the regenerative calciner.

Further, a second aspect of the present invention is featured in that, in the first aspect of the present invention, the heat medium is quicklime.

Further, a manufacturing facility of slaked lime according to a third aspect of the present invention is featured by including: the manufacturing facility for quicklime according to one of the first aspect and the second aspect; a slaking machine which produces slaked lime by supplying slaking water to the quicklime produced in the manufacturing facility for quicklime; an aging machine which ages the slaked lime discharged from the slaking machine; a drying machine which dries the slaked lime containing water and aged in the aging machine; and heat exchange means which supplies, as a heat source of the drying machine, steam generated by heat exchange between water and the combustion exhaust gas or the $CO_2$ gas discharged from the exhaust pipe of the manufacturing facility for quicklime.

Further, a fourth aspect of the present invention is featured in that, in the third aspect, a buffer tank for temporarily storing the quicklime taken out from the discharge port is provided between the manufacturing facility for quicklime and the slaking machine.

Further, a manufacturing process for slaked lime according to a fifth aspect of the present invention is featured by including: manufacturing slaked lime by using the manufacturing facility for slaked lime according to one of the third aspect and the fourth aspect; and recovering the $CO_2$ gas having passed through the heat exchange means.

Advantageous Effects of Invention

According to the first aspect or the second aspect, the limestone is supplied from the supply port, while the heat medium filled in the regenerative calciner is heated by the heating means to a temperature not less than the calcination temperature of limestone so that the temperature of the atmosphere in the regenerative calciner is maintained at a temperature not less than the calcination temperature. Then, the particles of the limestone are effectively heated and calcined by entering between the particles of the heat medium having a particle diameter larger than the particle diameter of the limestone. Thereby, the chemical reaction as represented by the formula: $CaCO_3 \rightarrow CaO + CO_2 \uparrow$ is caused so that quicklime is produced and $CO_2$ gas is generated. As a result, the inside of the regenerative calciner is filled with the $CO_2$ gas generated by the calcination of limestone, and the concentration of $CO_2$ gas in the regenerative calciner becomes about 100%. Thereby, the $CO_2$ gas having a concentration of about 100% can be recovered from the regenerative calciner via the exhaust pipe. In addition, when the calcination temperature is set to a relatively low temperature, it is possible to obtain highly active powdery quicklime.

At this time, in the regenerative calciner described above, limestone is heated and calcined by the heat medium which has a particle diameter larger than the particle diameter of the limestone and hence which has an extremely small specific surface area. Thereby, a large amount of heat can be stored in the regenerative calciner. Also, even when the heat medium is heated to a temperature not less than the calcination temperature of the limestone, that is, to a temperature not less than 1000° C. in the regenerative calciner, sticking and fusion between the particles of the heat medium or sticking and fusion between the particle of the heat medium and the furnace wall are suppressed, so that the occurrence of a coating trouble and the like can be suppressed.

Further, since the heat medium having a particle diameter larger than the particle diameter of the limestone is used, the produced powdery quicklime can be simply taken out from the regenerative calciner by being fluidized by the $CO_2$ gas generated at the time of calcination described above and then by being made to overflow from the regenerative calciner, or by being discharged from the regenerative calciner together with the $CO_2$ gas generated at the time of calcination and then by being separated from the $CO_2$ gas by solid-gas separation.

Here, as the heat medium, it is possible to use ceramics materials, such as silica ($SiO_2$) and alumina ($Al_2O_3$), and metal materials, such as a heat-resistant alloy, as long as the materials have heat resistance to the heating temperature in the regenerative calciner, and have abrasion resistance at the time of being mixed with limestone.

Particularly, as in the second aspect, when quicklime is used as the heat medium, there is an advantage that the melting point of the heat medium is as high as about 2500° C. and that the particles of the heat medium are hardly fused to each other. It is also preferred to use quicklime as the heat medium, because no adverse effect is caused even in the case where, while the calcination of the limestone is repeated in the regenerative calciner by using quicklime as the heat medium, fine powder is generated as a result of gradual abrasion of the quicklime.

Further, according to one of the third aspect to the fifth aspect, highly active powdery quicklime obtained by one of the first aspect and the second aspect can be used as a raw material, and hence slaked lime having high reactivity can be manufactured.

Further, since, in the heat exchange means, steam to be used as the heat source of the drying machine is obtained by high-temperature and high-concentration $CO_2$ gas discharged from the manufacturing facility for quicklime, a high thermal efficiency and an excellent economic efficiency can be obtained, and also $CO_2$ gas having a temperature lowered by the heat exchange and having a concentration of about 100% can be recovered from the heat exchange means.

Note that, in the present invention, in the case where a plurality of regenerative calciners are provided, when limestone is calcined in at least one of the regenerative calciners, the heat medium can be heated to a temperature not less than the calcination temperature of limestone to store heat in at least one of the other regenerative calciners. Therefore, when the calcination and heating processes are repeated alternatively or in a fixed sequence in the plurality of regenerative calciners, quicklime can be manufactured by continuously calcining limestone.

On the other hand, according to the fifth aspect of the present invention, a buffer tank for temporarily storing the quicklime taken out from the discharge port of the regenerative calciner is provided between the manufacturing facility for quicklime and the slaking machine. Therefore, even in the case where batch processing is performed by using one regenerative calciner, slaked lime can be continuously manufactured in the subsequent stages of the slaking machine, and the like, thus providing an advantage that the facility cost and the maintenance cost can be reduced.

DESCRIPTION OF EMBODIMENTS

Figure 1:
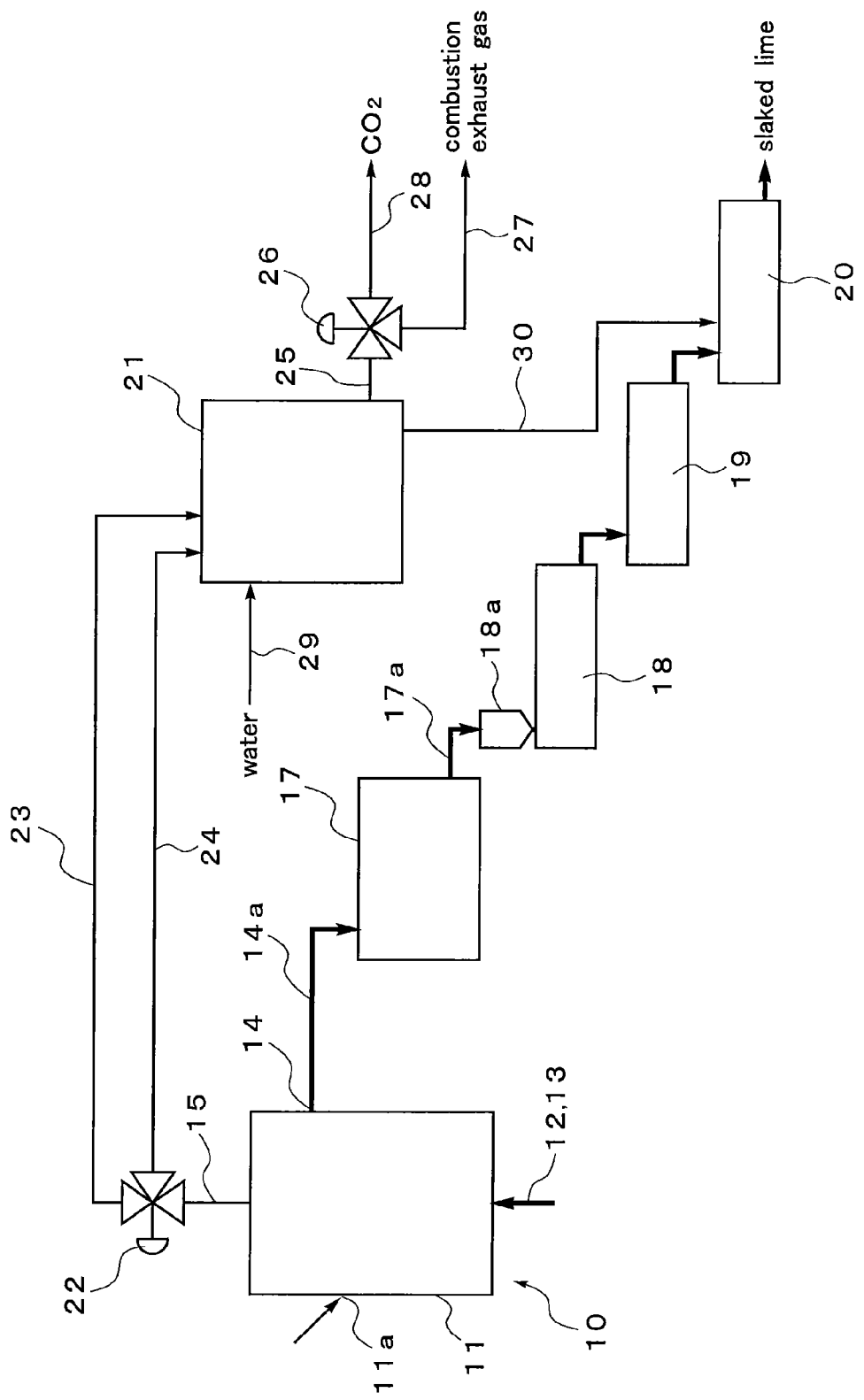
FIG. 1 is a view showing a schematic configuration of an embodiment of a manufacturing facility for slaked lime according to the present invention.
Figure 2:
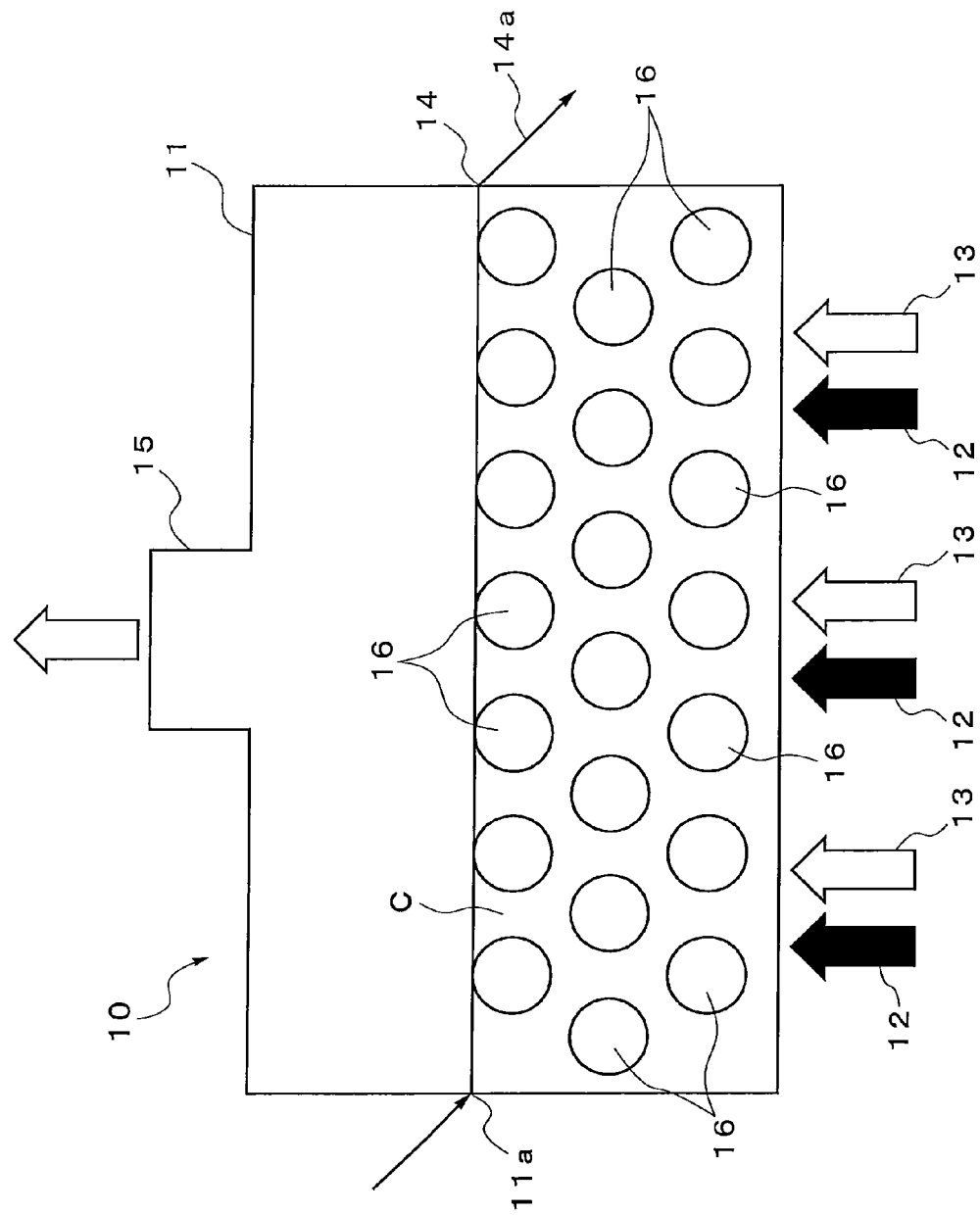
FIG. 2 is a longitudinal sectional view schematically showing an embodiment of a manufacturing facility for quicklime according to the present invention.

FIG. 1 and FIG. 2 show an embodiment of a manufacturing facility for quicklime according to the present invention, and an embodiment of a manufacturing facility for slaked lime using the manufacturing facility for quicklime. Reference numeral 10 in FIG. 1 and FIG. 2 denotes a manufacturing facility for quicklime, and reference numeral 11 denotes a regenerative calciner which is a main portion of the manufacturing facility for quicklime.

The regenerative calciner 11 is a horizontal furnace configured such that a supply port 11a for supplying, to the inside of the furnace, limestone C crushed into particles having a particle diameter of 10 μm to 1 mm is provided at an upper part of the regenerative calciner 11, and such that a burner (heating means: not shown) capable of maintaining the temperature of the atmosphere in the regenerative calciner 11 at a temperature not less than the calcination temperature of the limestone (for example, about 900° C.) is provided at a lower part of the regenerative calciner 11.

Further, a fuel pipe 12 and an air pipe 13, which respectively supply fuel and combustion air, are connected to each of one or more burners provided at a bottom part of the regenerative calciner 11.

On the other hand, a discharge port 14 for taking out powdery quicklime produced by the calcination is provided at the side wall of the regenerative calciner 11 and at a predetermined height position from the bottom part of the regenerative calciner 11. An exhaust pipe 15 for discharging combustion exhaust gas of the burner or $CO_2$ gas generated by the calcination of limestone is connected to a ceiling part of the regenerative calciner 11.

Further, a heat medium 16 is filled in the regenerative calciner 11. As the heat medium 16, quicklime having a particle diameter larger than the particle diameter of the limestone C which is supplied into the regenerative calciner 11 is used.

Further, a buffer tank 17 for temporarily storing the quicklime taken out from the discharge port 14 via an overflow pipe 14a, a slaking machine 18, an aging machine 19 for aging the slaked lime discharged from the slaking machine 18, and a drying machine 20 for drying the slaked lime aged in the aging machine 19 and containing water are successively arranged at the subsequent stage of the quicklime manufacturing facility 10 configured as described above.

Here, the slaking machine 18, the aging machine 19, and the drying machine 20 are known apparatuses used in a general manufacturing facility for slaked lime. That is, in the slaking machine 18, slaked lime is produced in such a manner that slaking water consisting of cold water containing an additive, such as ethylene glycol, a diethylene glycol, and glycerin, is supplied from a slaking water feed line (not shown) to the quicklime which is charged into the slaking machine 18 by a fixed amount at each charging operation via a hopper 18a from a discharge pipe 17a of the buffer tank 17, and that the slaking water and the quicklime are stirred to be mixed with each other.

Further, in the aging machine 19, the slaked lime produced by slaking reaction in the slaking machine 18 and containing water is aged while being stirred. In the drying machine 20, the slaked lime aged in the aging machine 19 is dried while being stirred, and thereby the water contained in the slaked lime is removed. Then, the slaked lime discharged from the drying machine 20 is pulverized and classified, so that slaked lime having a predetermined particle size is obtained as a product.

Further, the manufacturing facility for slaked lime is provided with an exhaust heat boiler (heat exchange means) 21 which generates steam by using, as a heating source, the exhaust gas or the $CO_2$ gas discharged from the regenerative calciner 11 of the manufacturing facility 10 for quicklime, and which supplies the generated steam to the drying machine 20 as steam for drying. That is, a three-way selector valve 22 is connected to the exhaust pipe 15 of the regenerative calciner 11, and a transfer pipe 23 of combustion exhaust gas and a transfer pipe 24 of $CO_2$ gas are respectively connected to the two discharge side ports of the three-way selector valve 22.

Further, the transfer pipe 23 of combustion exhaust gas and the transfer pipe 24 of $CO_2$ gas are respectively connected to the heat source supply side of the exhaust heat boiler 21. Further, a three-way selector valve 26 is also connected to a heat source discharge pipe 25 of the exhaust heat boiler 21. A discharge pipe 27 of combustion exhaust gas and a discharge pipe 28 of $CO_2$ gas are respectively connected to the two discharge side ports of the three-way selector valve 26. Note that it is also possible to configure such that the exhaust pipe 15 of the regenerative calciner 11 is directly connected to the exhaust heat boiler 11 without using the three-way selector valve 22, the transfer pipe 23 of combustion exhaust gas, and the transfer pipe 24 of $CO_2$ gas, and such that the discharge pipe 27 of combustion exhaust gas and the discharge pipe 28 of $CO_2$ gas are switched only by the three-way selector valve 26.

On the other hand, a steam supply pipe 30 is connected between the exhaust heat boiler 21 and the drying machine 20, the steam supply pipe 30 being configured to supply, to the drying machine 20, the steam as a heat source, which steam is generated in the exhaust heat boiler 21 by evaporating water supplied from a water supply pipe 29 by the heat of the combustion exhaust gas or the $CO_2$ gas supplied from the transfer pipe 24 or the transfer pipe 25.

Next, there will be described an embodiment of a manufacturing process for slaked lime according to the present invention using the slaked-lime manufacturing facility configured as described above.

First, in the regenerative calciner 11 of the manufacturing facility for quicklime, fuel and combustion air are supplied to the burner provided at the bottom part of the regenerative calciner 11 from the fuel pipe 12 and the air pipe 13, and the heat medium 16 in the regenerative calciner 11 is heated to a temperature not less than the calcination temperature of limestone C (for example, 1200° C.), so as to store heat in the regenerative calciner 11. Further, the combustion exhaust gas discharged at this time is supplied, as a heat source, to the exhaust heat boiler 21 from the exhaust pipe 15 via the three-way selector valve 22 and the transfer pipe 23 of combustion exhaust gas. Note that the combustion exhaust gas, the temperature of which is lowered by the heat exchange in the exhaust heat boiler 21, is discharged from the heat source discharge pipe 25 via the three-way selector valve 26 and the discharge pipe 27 of combustion exhaust gas.

Then, in a state where the atmosphere in the regenerative calciner 11 is held at a temperature not less than the calcination temperature of limestone C, the three-way selector valve 22 is switched so as to communicate with the $CO_2$ transfer pipe 24, and granular limestone C is supplied to the inside of the regenerative calciner 11 from the supply port 11a, so as to be heated to a temperature not less than the calcination temperature (for example, 900° C.) by the heat medium 16 in the regenerative calciner 11. As a result, a chemical reaction as represented by the formula: $CaCO_3 \rightarrow CaO + CO_2\uparrow$ is caused, so that quicklime is produced and $CO_2$ gas is generated.

The $CO_2$ gas generated in the regenerative calciner 11 is supplied, as a heat source, to the exhaust heat boiler 21 from the exhaust pipe 15 via the three-way selector valve 22 and the transfer pipe 24 of $CO_2$ gas. Then, the $CO_2$ gas, the temperature of which is lowered by heat exchange with water in the exhaust heat boiler 21, is recovered as high-concentration $CO_2$ gas via the discharge pipe 28 of $CO_2$ gas from the three-way selector valve 26 switched to the discharge pipe 28 of $CO_2$ gas.

In this way, the combustion exhaust gas or the $CO_2$ gas is supplied, as a heat source, to the exhaust heat boiler 21. Thereby, steam is generated from water continuously supplied from the supply pipe 29 in the exhaust heat boiler 21, and the generated steam is supplied to the drying machine 20 from the steam supply pipe 30.

On the other hand, the quicklime produced in the regenerative calciner 11 is fluidized by the $CO_2$ gas generated at the time of calcination. The fluidized quicklime is made to overflow from the overflow pipe 14a and is sent to the buffer tank 17 so as to be temporarily stored in the buffer tank 17.

The quicklime stored in the buffer tank 17 is charged into the slaking machine 18 from the discharge pipe 17a via the hopper 18a by a fixed amount at each charging operation, and slaking water supplied from a slaking water feed line (not shown) is added and stirred into the quicklime. As a result, a chemical reaction as represented by the formula: $CaO + H_2O \rightarrow Ca(OH)_2$ is caused, so that slaked lime is produced.

After the slaked lime produced by the slaking reaction in the slaking machine 18 is sent to the aging machine 19 and aged in the aging machine 19, the slaked lime is dried in the drying machine 20 by the steam supplied from the exhaust heat boiler 21 and is then discharged from the drying machine 20.

As described above, according to the quicklime manufacturing facility 10 configured as described above, and the slaked-lime manufacturing facility provided with the quicklime manufacturing facility 10, and according to the slaked-lime manufacturing process using the manufacturing facilities, it is possible that the limestone C is supplied from the supply port 11a in a state where the heat medium 16 filled in the regenerative calciner 11 is heated by the burner to a temperature not less than the calcination temperature of limestone so as to maintain the temperature of the atmosphere in the regenerative calciner 11 at a temperature not less than the calcination temperature, and that $CO_2$ gas generated by the calcination of the limestone C and having a concentration of about 100% is recovered via the transfer pipe 24 and the exhaust heat boiler 21 from the discharge pipe 28 of the exhaust heat boiler 21.

At this time, the limestone C is heated and calcined in the regenerative calciner 11 by the heat medium 16 having a particle diameter larger than the particle diameter of the limestone C and hence having an extremely small specific surface area. Thereby, a large amount of heat can be stored in the regenerative calciner 11. Also, even when the heat medium 16 is heated to a temperature not less than the calcination temperature of the limestone C, that is, to a temperature not less than 1000° C. in the regenerative calciner 11, sticking and fusion between the particles of the heat medium 16, and sticking and fusion between the particle of the heat medium 16 and the furnace wall are suppressed, so that the occurrence of a coating trouble and the like can be suppressed.

Further, since the heat medium 16 having a particle diameter larger than the particle diameter of the limestone C is used, it is possible that the produced powdery quicklime is fluidized by the $CO_2$ gas generated at the time of calcination described above, and that the fluidized quicklime is made to overflow from the regenerative calciner 11 so as to be simply taken out from the regenerative calciner 11.

Further, since quicklime is used as the heat medium 16, the heat medium 16 has a melting point as high as about 2500° C., and hence particles of the heat medium 16 are hardly fused to each other. Also, no adverse effect is caused even in the case where, while the calcination of the limestone C is repeated in the regenerative calciner 11 by using quicklime as the heat medium 16, fine powder is generated as a result of gradual abrasion of the quicklime.

In addition, steam used as a heat source of the drying machine 20 is obtained by sending, to the exhaust heat boiler 11, high-temperature combustion exhaust gas and high-temperature and high-concentration $CO_2$ gas which are discharged from the manufacturing facility for quicklime, and hence high thermal efficiency and excellent economic efficiency can be obtained.

Figure 3:
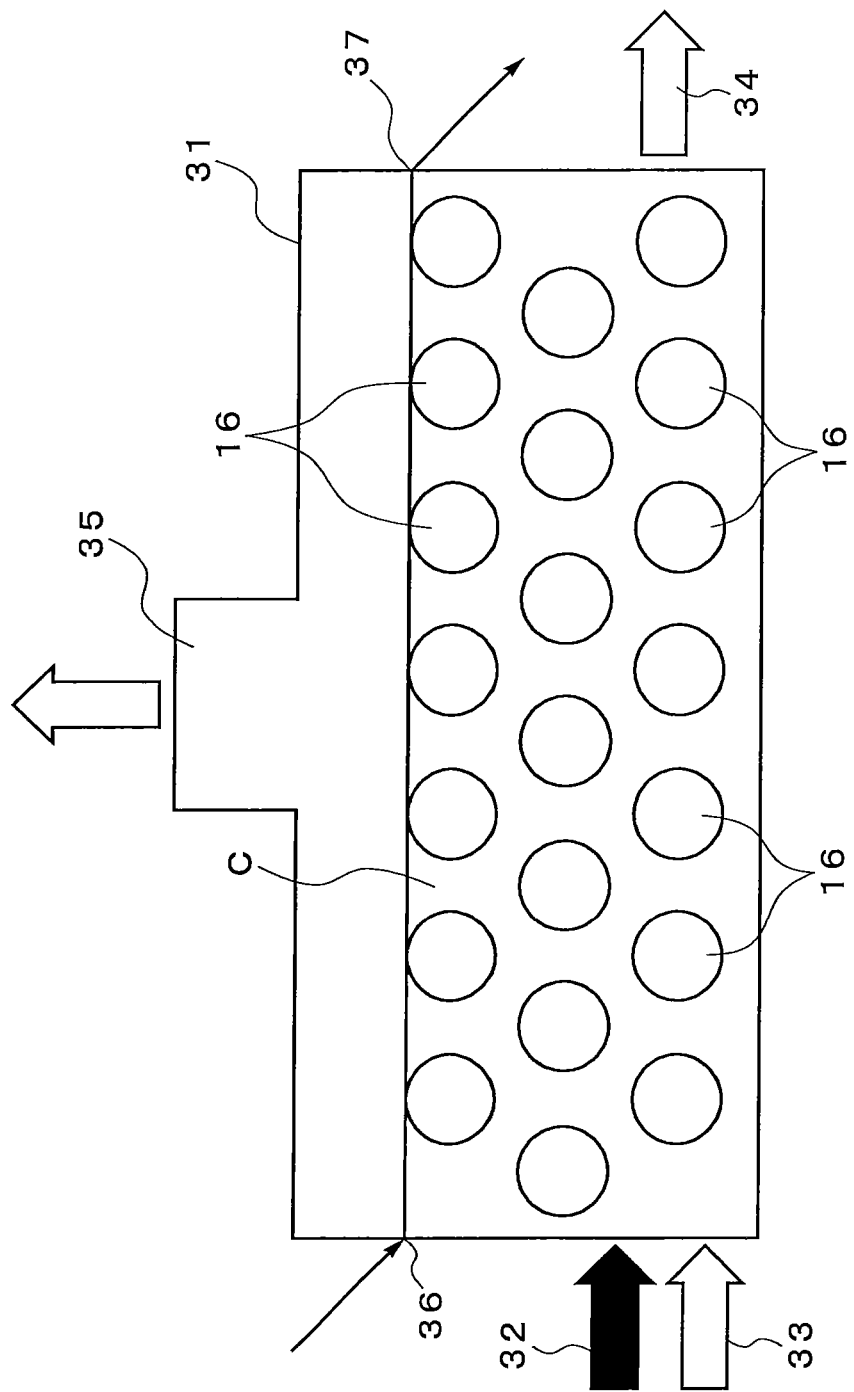
FIG. 3 is a longitudinal sectional view schematically showing a modification of FIG. 2.

FIG. 3 shows a modification of the manufacturing facility for quicklime configured as described above. In this manufacturing facility, a burner for heating the inside of a regenerative calciner 31 is provided at one of the lower side surfaces of the regenerative calciner 31, and a fuel pipe 32 and an air pipe 33 for respectively supplying fuel and combustion air are connected to the burner.

Further, a transfer pipe 34 for discharging combustion exhaust gas generated at the time of heating the heat medium 16 and storing heat in the regenerative calciner 31 is provided at the other of the lower side surfaces of the regenerative calciner 31. The transfer pipe 34 is directly connected to the heat source supply side of the exhaust heat boiler 21. On the other hand, a transfer pipe 35 for discharging $CO_2$ gas generated in the regenerative calciner 31 is provided at a ceiling part of the regenerative calciner 31. The transfer pipe 35 is directly connected to the heat source supply side of the exhaust heat boiler 21. Note that, in FIG. 3, reference numeral 36 denotes a supply port of granular limestone C, and reference numeral 37 denotes a discharge port of quicklime generated in the regenerative calciner 31.

Therefore, in the quicklime manufacturing facility configured as described above, the combustion exhaust gas generated at the time of storing heat is directly sent to the exhaust heat boiler 21 from the transfer pipe 34, and the $CO_2$ gas generated at the time of calcination of the limestone C is directly sent, as a heat medium, to the exhaust heat boiler 21 from the transfer pipe 35. Further, quicklime generated in the regenerative calciner 31 is fluidized by the $CO_2$ gas generated at the time of calcination of the limestone C. The fluidized quicklime is made to overflow from the discharge port 37 and is sent to the buffer tank 17 so as to be temporarily stored in the buffer tank 17.

Figure 4:
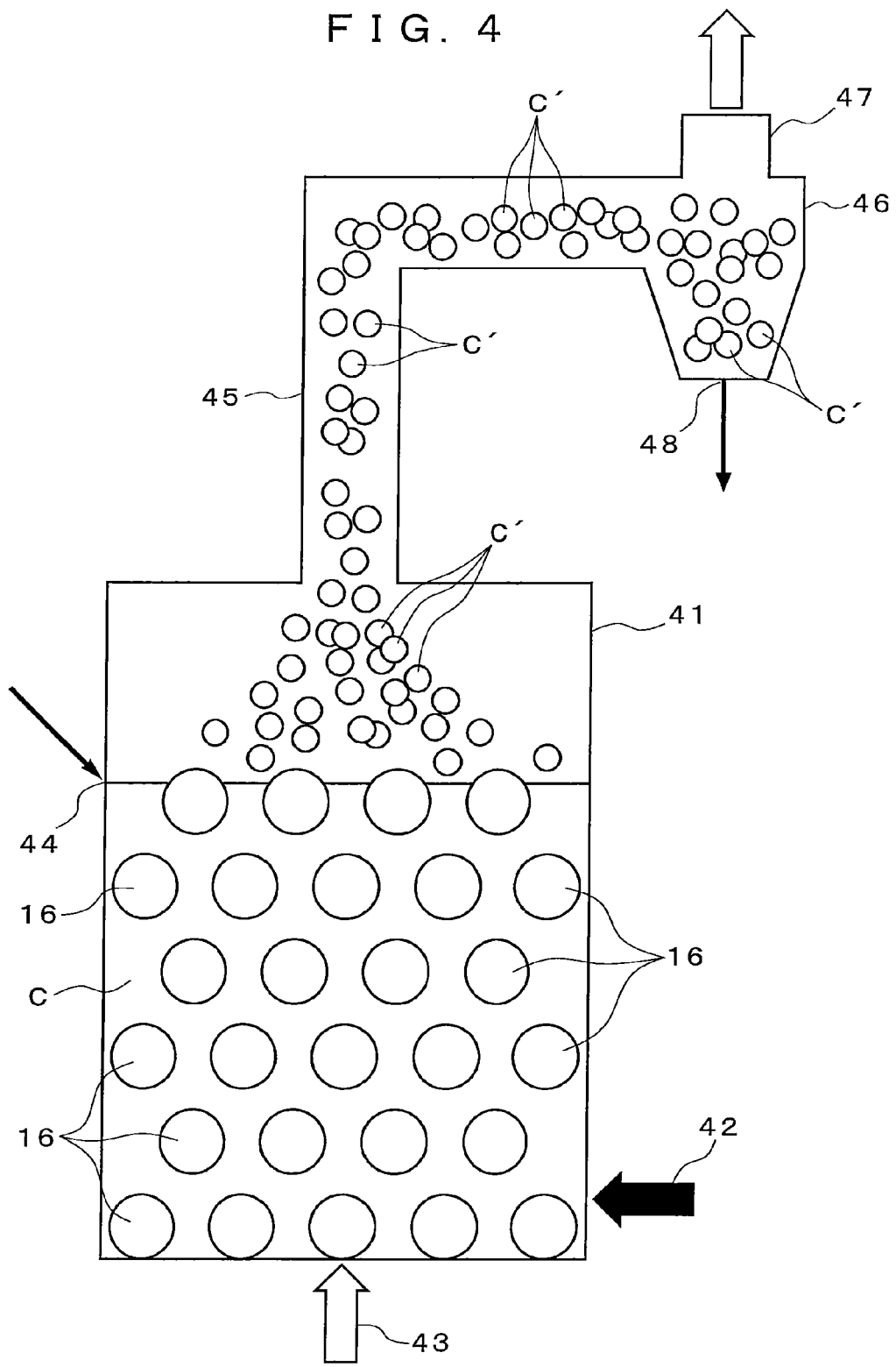
FIG. 4 is a longitudinal sectional view schematically showing another embodiment of the manufacturing facility for quicklime according to the present invention.
Figure 5:
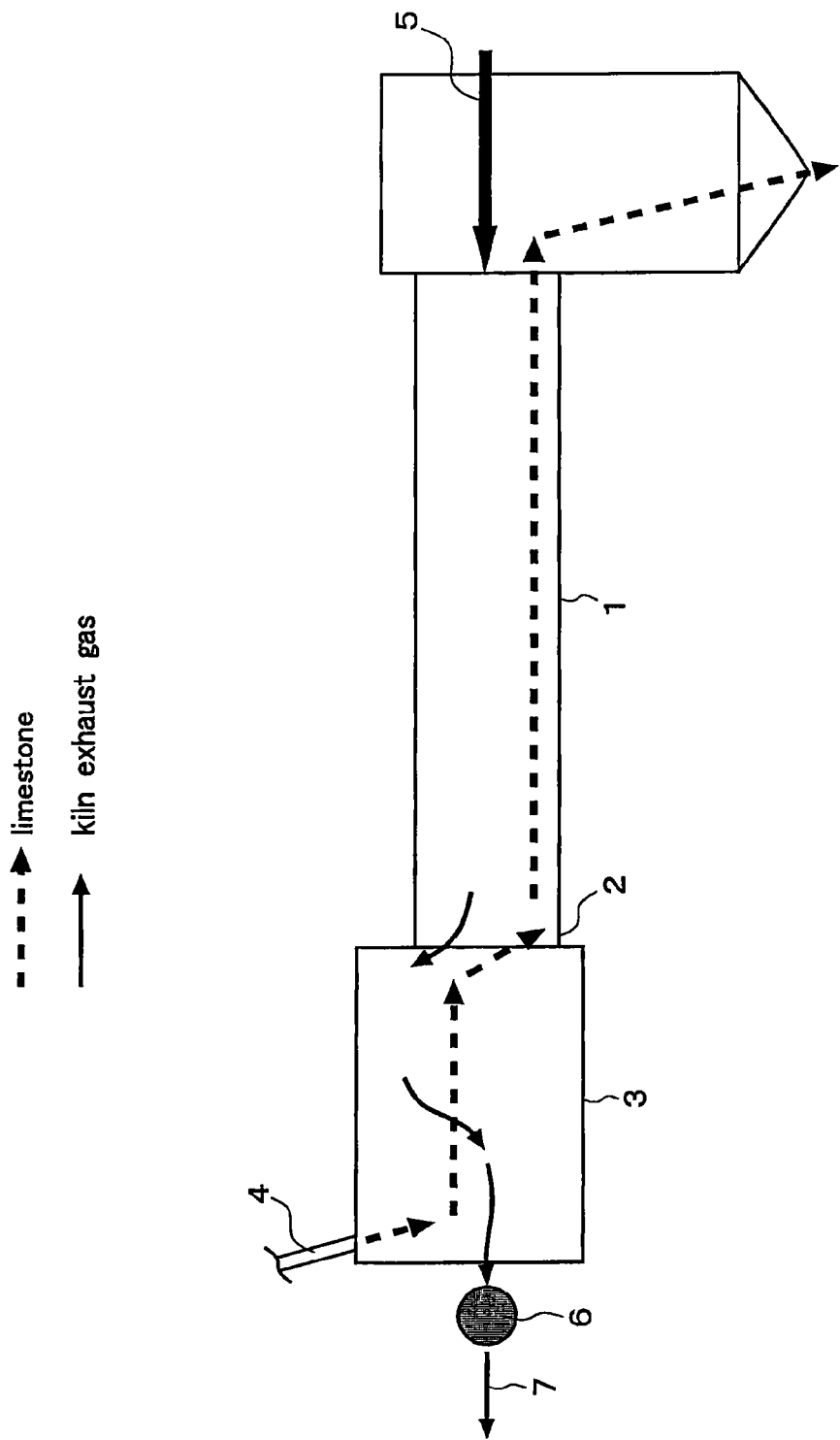
FIG. 5 is a view showing a schematic configuration of a conventional manufacturing facility for quicklime.

FIG. 4 shows another embodiment of the manufacturing facility for quicklime according to the present invention. This manufacturing facility is provided with a vertical type regenerative calciner 41 in which the same heat medium 16 is filled.

A burner, to which a supply pipe 42 for supplying fuel is connected, is provided at a lower side surface of the regenerative calciner 41, and a supply pipe 43 of combustion air is provided at a bottom part of the regenerative calciner 41. Further, a supply port 44 for introducing granular limestone C is provided at one of the side surfaces of the regenerative calciner 41.

Further, a discharge pipe 45 for discharging combustion exhaust gas or $CO_2$ gas in the regenerative calciner 41 is provided at a ceiling part of the regenerative calciner 41, and a cyclone 46 is provided at the outlet side of the discharge pipe 45. Further, an exhaust gas pipe 47 for exhausting combustion exhaust gas or $CO_2$ gas is provided at a ceiling part of the cyclone 46, and the three-way selector valve 22 described above is connected to the exhaust gas pipe 47.

On the other hand, a discharge port 48 for extracting quicklime C', from which $CO_2$ gas generated at the time of calcination has been separated, is provided at a bottom part of the cyclone 46. The quicklime C' discharged from the discharge port 48 is charged into the buffer tank 17 described above.

In the quicklime manufacturing facility configured as described above, the $CO_2$ gas, which is generated when the limestone C supplied from the supply port 44 is calcined by the heat medium 16, is introduced into the cyclone 46 from the discharge pipe 45 together with the produced quicklime C'. Then, the $CO_2$ gas and the quicklime C' are separated from each other in the cyclone 46. Further, the separated quicklime C' is discharged from the discharge port 48 provided at the bottom part of the cyclone 46 and is charged into the buffer tank 17. On the other hand, the $CO_2$ gas separated in the cyclone 46 is similarly supplied, as a heat medium, to the exhaust heat boiler 21 via the three-way selector valve 22 from the exhaust gas pipe 47 provided at the ceiling part of the cyclone 46.

Therefore, also with the quicklime manufacturing facility using one of the regenerative calciners 31 and 41, and with the slaked-lime manufacturing facility and process each using the quicklime manufacturing facility, the same operation effects can be obtained.

INDUSTRIAL APPLICABILITY

The present invention can be used for recovering, in a high concentration, $CO_2$ gas generated at the time of producing quicklime and slaked lime, and can be used for recovering, in a high concentration, $CO_2$ gas generated at the time of producing of quicklime.

REFERENCE SIGNS LIST 11, 31, 41 Regenerative calciner
11a, 36, 44 Supply port of limestone
14, 37, 48 Discharge port of quicklime
15, 45 Exhaust pipe
16 Heat medium
17 Buffer tank
18 Slaking machine
19 Aging machine
20 Drying machine
21 Exhaust heat boiler (Heat exchange means)
C Limestone
C' Quicklime

The invention claimed is:

1. A facility for manufacturing slaked lime, the facility comprising:
an apparatus for manufacturing quicklime, comprising
(i) a regenerative calciner comprising
a supply port configured to supply granular limestone into the regenerative calciner,
a heater configured to maintain temperature of an atmosphere in the regenerative calciner at a temperature not less than a calcination temperature of the granular limestone,
an exhaust pipe connected to an upper part of the regenerative calciner and configured to discharge combustion exhaust gas from the heater and $CO_2$ gas generated by calcination of the granular limestone,
a three-way selector valve connected to the exhaust pipe such that the three-way selector valve is positioned between the upper part of the regenerative calciner and a heat exchanger, and
a discharge port configured to remove quicklime produced by the calcination therefrom, and (ii) a heat medium having a particle diameter larger than a particle diameter of the granular limestone, the heat medium being filled in the regenerative calciner, a slaking machine configured to produce slaked lime by supplying slaking water to quicklime manufactured in the apparatus;

an aging machine configured to age the slaked lime discharged from the slaking machine;

a drying machine configured to dry the slaked lime comprising water and aged in the aging machine; and the heat exchanger configured to supply, as a heat source of the drying machine, steam generated by heat exchange between water and the combustion exhaust gas or the $CO_2$ gas discharged from the exhaust pipe of the apparatus, wherein a first discharge side port of the three-way selector valve is connected to a first transfer pipe, a second discharge side port of the three-way selector valve is connected to a second transfer pipe, and the first transfer pipe and the second transfer pipe are connected to the heat exchanger and configured to respectively feed the combustion exhaust gas and the $CO_2$ gas to the heat exchanger.

2. The facility according to claim 1, wherein the heat medium is quicklime.

3. The facility according to claim 1, further comprising a buffer tank configured to temporarily store the quicklime removed from the discharge port, wherein the buffer tank is positioned between the apparatus and the slaking machine.

4. A manufacturing process, comprising:
manufacturing slaked lime with the facility according to claim 1; and
recovering the $CO_2$ gas having passed through the heat exchanger.

5. The facility according to claim 1, wherein the heat exchanger comprises a heat source discharge pipe and a second three-way selector valve connected to the heat source discharge pipe.

6. The facility according to claim 5, wherein
a first discharge side port of the second three-way selector valve is connected to a first discharge pipe, and
a second discharge side port of the second three-way selector valve is connected to a second discharge pipe.

7. The facility according to claim 1, wherein the facility comprises a plurality of the apparatus.

8. The facility according to claim 1, wherein the granular limestone has a diameter of from 10 μm to 1 mm.

9. A facility for manufacturing slaked lime, the facility comprising:
an apparatus for manufacturing quicklime, comprising
(i) a regenerative calciner comprising
a supply port configured to supply granular limestone into the regenerative calciner,
a heater configured to maintain temperature of an atmosphere in the regenerative calciner at a temperature not less than a calcination temperature of the granular limestone,
an exhaust pipe connected to an upper part of the regenerative calciner and configured to discharge combustion exhaust gas from the heater and $CO_2$ gas generated by calcination of the granular limestone,
a three-way selector valve connected to the exhaust pipe, and
a discharge port configured to remove quicklime produced by the calcination therefrom, and
(ii) a heat medium having a particle diameter larger than a particle diameter of the granular limestone, the heat medium being filled in the regenerative calciner;

a slaking machine configured to produce slaked lime by supplying slaking water to quicklime manufactured in the apparatus;

an aging machine configured to age the slaked lime discharged from the slaking machine;

a drying machine configured to dry the slaked lime comprising water and aged in the aging machine; and a heat exchanger configured to supply, as a heat source of the drying machine, steam generated by heat exchange between water and the combustion exhaust gas or the $CO_2$ gas discharged from the exhaust pipe of the apparatus, wherein a first discharge side port of the three-way selector valve is connected to a first transfer pipe, a second discharge side port of the three-way selector valve is connected to a second transfer pipe, and the first transfer pipe and the second transfer pipe are connected to the heat exchanger and configured to respectively feed the combustion exhaust gas and the $CO_2$ gas to the heat exchanger.

10. A manufacturing process for producing slaked lime, comprising:
manufacturing slaked lime with the facility according to claim 9; and
recovering the $CO_2$ gas having passed through the heat exchanger.

11. The facility according to claim 9, wherein the heat exchanger comprises a heat source discharge pipe and a second three-way selector valve connected to the heat source discharge pipe.

12. The facility according to claim 11, wherein
a first discharge side port of the second three-way selector valve is connected to a first discharge pipe, and
a second discharge side port of the second three-way selector valve is connected to a second discharge pipe.

13. The facility according to claim 9, wherein the heat medium is quicklime.

14. The facility according to claim 9, further comprising a buffer tank configured to temporarily store the quicklime removed from the discharge port, wherein the buffer tank is positioned between the apparatus and the slaking machine.

15. The facility according to claim 9, wherein the facility comprises a plurality of the apparatus.

16. The facility according to claim 9, wherein the granular limestone has a diameter of from 10 μm to 1 mm.

* * * * *